United States Patent [19]

Hadley et al.

[11] Patent Number: 4,723,787
[45] Date of Patent: Feb. 9, 1988

[54] IMPLEMENT TRANSPORT HITCH

[75] Inventors: Howard C. Hadley, Urbandale; Marvin L. Bigbee, Ankeny; John R. Myers, Polk City, all of Iowa

[73] Assignee: Deere & Company, Moline, Ill.

[21] Appl. No.: 834,671

[22] Filed: Feb. 28, 1986

[51] Int. Cl.[4] ............................................. A01B 73/00
[52] U.S. Cl. ............................... 280/411 A; 172/311; 172/456; 280/43.23; 280/412; 280/476 A
[58] Field of Search ........... 280/411 R, 411 B, 411 A, 280/411 C, 43.23, 412, 491 D, 656, 476 R, 476 A; 172/311, 443, 456, 680

[56] References Cited

U.S. PATENT DOCUMENTS

| | | | |
|---|---|---|---|
| 4,137,852 | 2/1979 | Pratt | 172/311 X |
| 4,171,022 | 10/1979 | Applequist | 172/456 X |
| 4,172,537 | 10/1979 | Gandrud et al. | 172/311 X |
| 4,214,637 | 7/1980 | Applequist | 172/311 X |
| 4,319,643 | 3/1982 | Carter et al. | 280/411 A X |
| 4,360,215 | 11/1982 | Nohl et al. | 172/311 X |
| 4,364,581 | 12/1982 | Shoup | 280/411 A |
| 4,496,004 | 1/1985 | Frase et al. | 172/311 |
| 4,504,076 | 3/1985 | Bedney | 172/311 X |
| 4,518,046 | 5/1985 | Rettig et al. | 172/311 |
| 4,529,040 | 7/1985 | Grollimund | 172/311 |
| 4,576,238 | 3/1986 | Spencer | 172/311 |
| 4,664,202 | 5/1987 | Applequist et al. | 172/311 |

FOREIGN PATENT DOCUMENTS 2059241 4/1981 United Kingdom ................ 172/680

OTHER PUBLICATIONS

Marliss 30' Folding Drill Brochure, 5845M, Date Stamped Sept. 26, 1984.
Great Plains Solid Stand 3-Section Folding Brochure, Date Stamped Sept. 25, 1984.
Crustbuster FoldnTow Silver Trash Shank Drills, 3400 Series Brochure, Date Stamped Sept. 26, 1984.
Tye New Folding Drills Brochure, Form 510.

Primary Examiner—John J. Love
Assistant Examiner—Mitchell J. Hill

[57] ABSTRACT

A fore-and-aft extending transport hitch frame carried on a pair of ground wheels supports the innermost ends of a pair of end wheel wing drills and tows a trailing end wheel drill between the wing drills. The wing drills are connected to rearwardly angled upright pivot structures on the hitch frame by hinged bracket structure which causes the innermost ends of the wing drills to lift as the drills are pivoted forwardly toward a transport position. The forward end of the hitch frame is lifted to raise the outboard ends of the wing drills for transport. During planting operations the ground wheels effectively act as the inboard end wheels for the wing drills. The wing drills can rock vertically about the bracket structure hinge for good flexibility in the field-working position.

22 Claims, 9 Drawing Figures

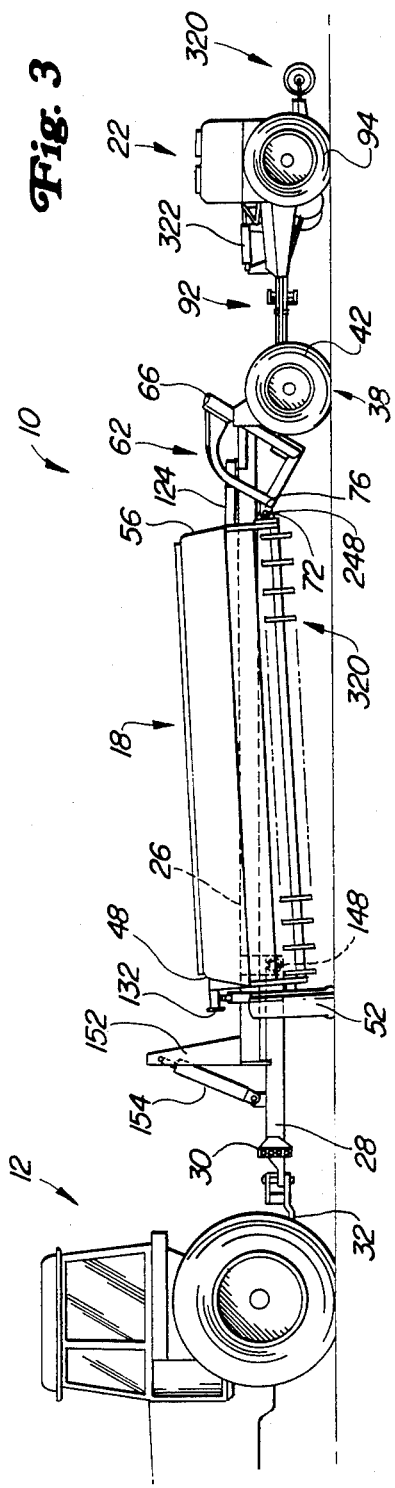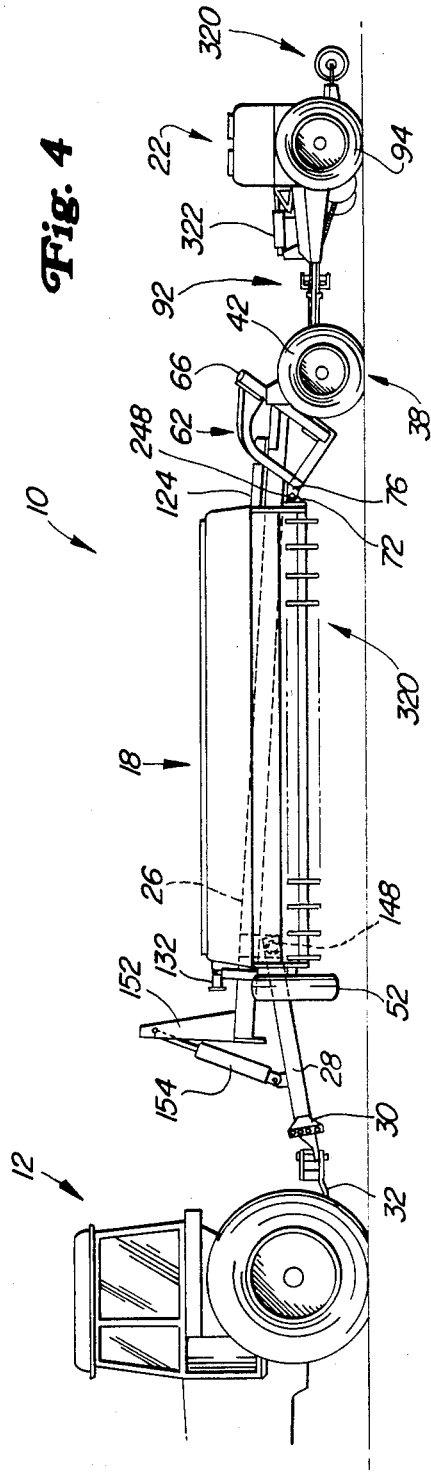

IMPLEMENT TRANSPORT HITCH

BACKGROUND OF THE INVENTION

This invention relates generally to foldable agricultural implements, and more specifically, to a folding hitch arrangement for a plurality of end wheel drills or the like.

Various types of hitch structures are available which support a plurality of implements in generally transversely spaced relationship for forward movement over the soil, so that a substantial width of ground may be worked or planted in a single pass. In order to provide for narrow transport of such machines, many of the hitch arrangements include structure for folding of at least a pair of outermost wing implements to a generally fore-and-aft configuration. Such hitch structures are well-known in the art, and are exemplified in U.S. Pat. Nos. 4,518,046; 4,504,076; 4,496,004; 4,360,215; 4,214,637; and 4,137,852. Although these arrangements have permitted the towing of multiple implements in generally end to end relationship across the ground while permitting a narrower transport configuration, most have suffered from one or more disadvantages. Some of the machines are not adapted to supporting more than a pair of implements, thereby limiting the width of ground that can be worked or planted in a single pass. Other of the hitch arrangements are relatively massive and add unwanted weight, as well as excess cost, to the machine. Some machines do not fold easily to and from the transport position particularly when soft ground conditions exist, and often the operator has to leave the towing vehicle, both when unfolding and folding the implements. Special transport wheel arrangements or multiple transport lift cylinders are necessary in some of the hitch structures, which can add to the complexity and expense of the machine. Also, maintaining very good flexibility for the implements over irregular terrain has been a continuing problem for some of the arrangements.

OBJECTS OF THE INVENTION

It is therefore an object of the present invention to provide an improved folding hitch arrangement. It is a further object to provide such a hitch arrangement which is particularly useful for towing three end wheel drills.

It is another object of the invention to provide an improved folding hitch arrangement which maintains a high degree of flexibility over a irregular terrain, and yet which folds easily between transport and field-working positions and transports efficiently and reliably at tractor transport speeds. It is a further object to provide such a hitch arrangement which is relatively simple and inexpensive to manufacture.

It is a further object of the invention to provide a multiple implement folding hitch arrangement which is easily folded and unfolded even on soft ground without the operator having to leave the towing vehicle. It is still another object to provide such a hitch arrangement which minimizes the number of hydraulic cylinders required for folding and lifting.

It is yet another object of the present invention to provide an improved folding hitch arrangement which has good ground clearance and a good stable transport function. It is a further object to provide such an arrangement which does not require bulky or expensive lift systems, multiple transport lift cylinders or special transport wheel arrangements.

It is another object of the invention to provide an improved folding hitch arrangement for supporting three end wheel drills. It is another object to provide such an arrangement wherein the wing drills are hinged to provide adequate flexibility for irregular terrain and are pivotally connected to the hitch structure such that the inner end of each wing drill is automatically raised as it is rotated to the transport position.

It is still another object of the invention to provide an improved folding hitch arrangement for three end wheel drills which is foldable quickly and easily, is relatively simple in construction and provides good ground clearance and a good stable transport function. It is a further object to provide such a grain drill hitch arrangement, wherein the center drill trails well and does not interfere with the wing drills as the implement is turned from the forward direction and wherein provision is made for stable backing of the implement.

BRIEF DESCRIPTION OF THE INVENTION

In accordance with the above objects, an end wheel drill transport hitch structure is provided having a hitch frame assembly, including a fore-and-aft extending hitch beam adapted for connection at its forward end to a towing vehicle and including a rear transverse frame member supported for forward movement over the ground by a pair of transversely spaced ground engaging wheels. The outer ends of the transverse frame member support upright pivots connected to the inboard ends of a pair of wing drills by hinged pivot bracket structure. The innermost end wheels of the wing drills are removed so that the innermost ends of the drills are gauged and supported substantially entirely by the corresponding ground engaging wheels on the hitch frame assembly. The upright pivots are angled rearwardly in the upward direction so that as the wing drills are swung forwardly about the pivot, the hinge pivot bracket structure lifts the innermost ends of the wing drills for good ground clearance without need for inboard transport lift cylinders. Each pivot bracket structure is hinged adjacent the innermost end of the corresponding wing drill so that the wing drill can pivot about a fore-and-aft extending axis when the drill is in the unfolded field-working position. As the wing drill is folded forwardly about the upright pivot to a generally fore-and-aft extending transport position, the innermost end of the drill is lifted while the outermost end of the drill remains supported by the outermost end wheel. Once the wing drill is folded to the fore-and-aft transport position, closely adjacent the hitch beam, the forward end of the hitch beam is raised and a bracket contacts the outer end of the wing drill to lift the drill onto the hitch beam. In one embodiment, the forward end of the hitch beam is connected to the lower arms of the three point hitch assembly on the tractor, and the arms are raised to raise the forward end of the hitch beam. In the second embodiment, the forward end of the hitch beam is articulated about a joint, and a hydraulic cylinder causes the forwardmost end of the hitch beam to pivot downwardly about the joint to raise the remainder of the hitch beam.

A transversely extending folding cylinder supported above the transverse frame member is connected between the upright pivots to move the wing drills between their folded and unfolded positions. A pair of drag links are slidably connected to the fore-and-aft extending hitch beam to stabilize the wing drill in the field-working position. A cylinder-operated unfolding mechanism is located on the hitch beam to contact the sliding portion of the drag unit as the wing drills approach the fully unfolded, field-working position to positively move the drag links to their rearwardmost unfolded position and hold the drag links for stable wing drill operation.

A trailing drill is connected by trailing hitch structure to the transverse frame member of the hitch frame assembly. The trailing drill is centered between the wing drills, directly behind the wing drills, and is supported by two end wheels, both when the hitch arrangement is in the transport and in the field-working positions. The trailing hitch structure includes a hitch connection, centrally located both in the fore-and-aft and in the transverse direction with respect to the forward wing drills, so that the trailing hitch accurately follows the wing drills as the implements are turned from the forward direction. The hitch connection can rock about both a fore-and-aft extending horizontal axis and an upright axis for good flexibility. The trailing hitch structure also includes telescoping side members which prevent the trailing drill from interfering with the wing drills on sharp turns. The telescoping side members can be locked in position to permit stable backing of the hitch structure. The trailing hitch structure provides sufficient flexibility for the trailing drill to ride over even the roughest terrain, while the hinge of the pivot bracket structure permits nearly unlimited flexibility of the wing drills to move up and down over the terrain. Good soil engaging characteristics are therefore provided even on the roughest terrain, without compromising stability and ground clearance in the transport mode. The ground wheels of the hitch frame assembly act as the respective innermost end wheels for the wing drills to provide good contour following and soil engaging characteristics with a minimum number of total wheels.

These and other objects, features and advantages of the present invention will become apparent to one skilled in the art upon reading the following detailed descriptions in view of the drawings.

BRIEF DESCRIPTION OF THE DRAWINGS

FIG. 3 is a side view of the hitch arrangement with the wing drills folded forwardly towards the transport position.

FIG. 4 is a view similar to FIG. 3 but showing the outboard ends of the wing drills supported on the hitch beam in a raised position.

DESCRIPTION OF THE PREFERRED EMBODIMENT

Figure 1:
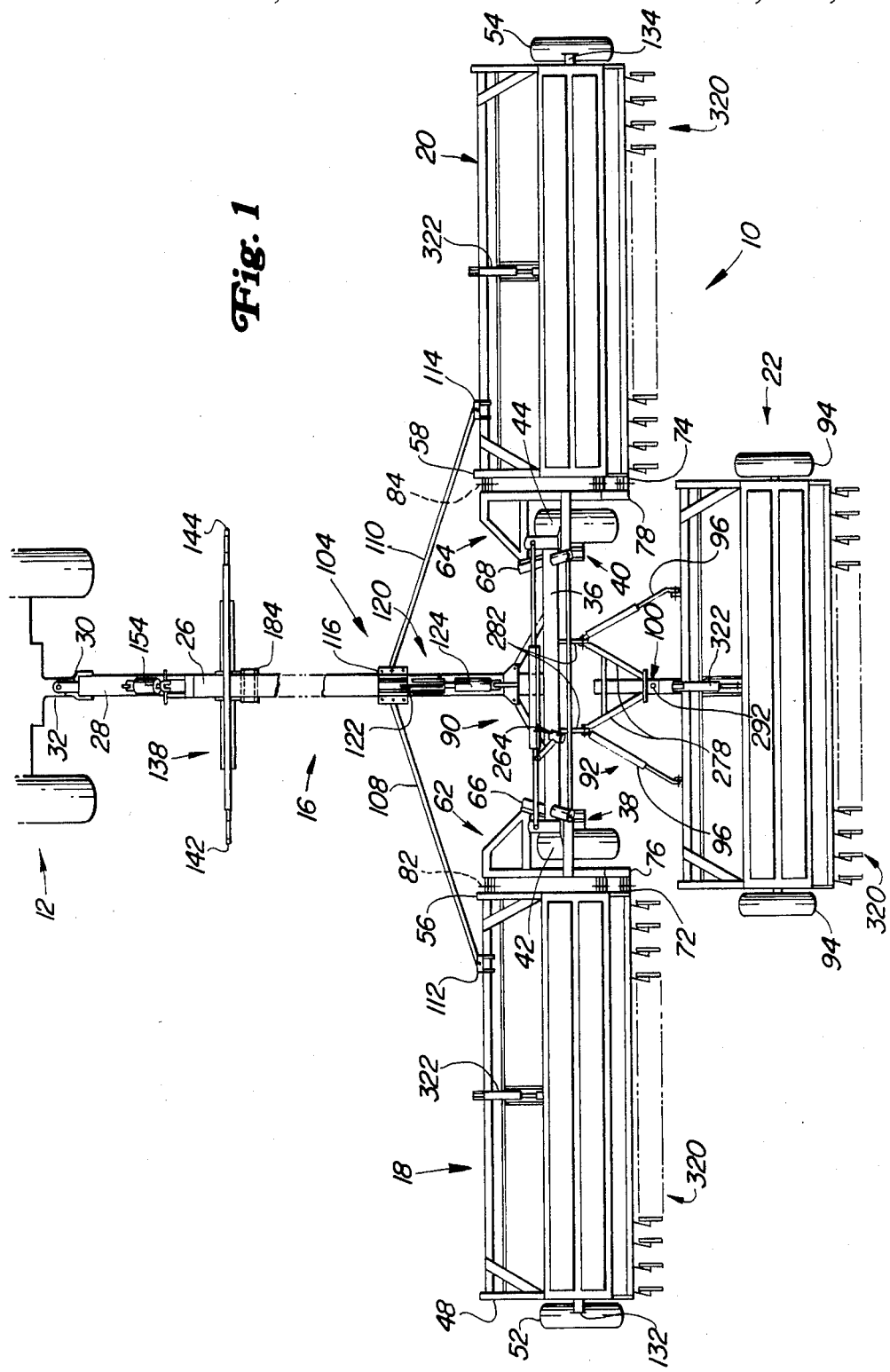
FIG. 1 is a top view showing the folding hitch arrangement of the present invention in the unfolded field-working position.

Referring to FIG. 1, therein is shown a folding implement transport hitch arrangement, indicated generally at 10, which is connected to a towing vehicle such as a tractor 12 for forward movement over the ground. The hitch arrangement 10 includes a hitch frame assembly 16 having attached thereto left and right wing implements 18 and 20, respectively, and a center trailing implement 22. As shown, the implements 18, 20 and 22 are end wheel grain drills although it is to be understood that other types of implements could be used as well with the hitch arrangement 10.

The hitch frame assembly 16 includes a fore-and-aft extending main hitch beam 26 having a forward end portion 28 with a connector 30 adapted for connection to the drawbar hitch 32 of the tractor 12. A transverse frame member 36 is connected to the aft end of the hitch beam 26 so that the hitch frame assembly 16 is generally T-shaped. Connected to the outermost ends of the transverse frame member 36 is a pair of generally identical wheel assemblies 38 and 40 including ground wheels 42 and 44, respectively, which support the aft end of the hitch frame assembly 16 for movement over the ground. The forward end of the hitch frame assembly is supported by the tractor drawbar hitch 32.

The wing drills 18 and 20 include outermost ends 48 and 50 supported above the ground by end wheels 52 and 54, respectively. The wing drills 18 and 20 also include inboard ends 56 and 58 connected by hinged pivot bracket structures 62 and 64, respectively, to the outboard ends of the transverse frame member 36 adjacent the corresponding wheel assemblies 38 and 40. The pivot bracket structures 62 and 64 extend around and over the corresponding wheels 42 and 44 and are connected by upright pivots 66 and 68 to the frame member 36. The innermost ends of the bracket structure 62 and 64 are connected at locations above and below the frame member 36 to the pivots 66 and 68 (FIGS. 6 and 7), and the pivots are angled rearwardly and outwardly in the upward direction so that as the bracket structures 62, 64 are rotated about their pivots the outermost ends of the bracket structures 62 and 64 raise to lift the respective inboard ends 56 and 58 of the wing drills 18 and 20.

Hinge brackets 72 and 74 are connected to the inboard ends 56 and 58 of the wing drills 18 and 20 and are pivotally connected to corresponding structures 76, 78 on the outermost ends of the pivot bracket structures 62, 64 for rocking about generally horizontal axes 82, 84.

Figure 2:
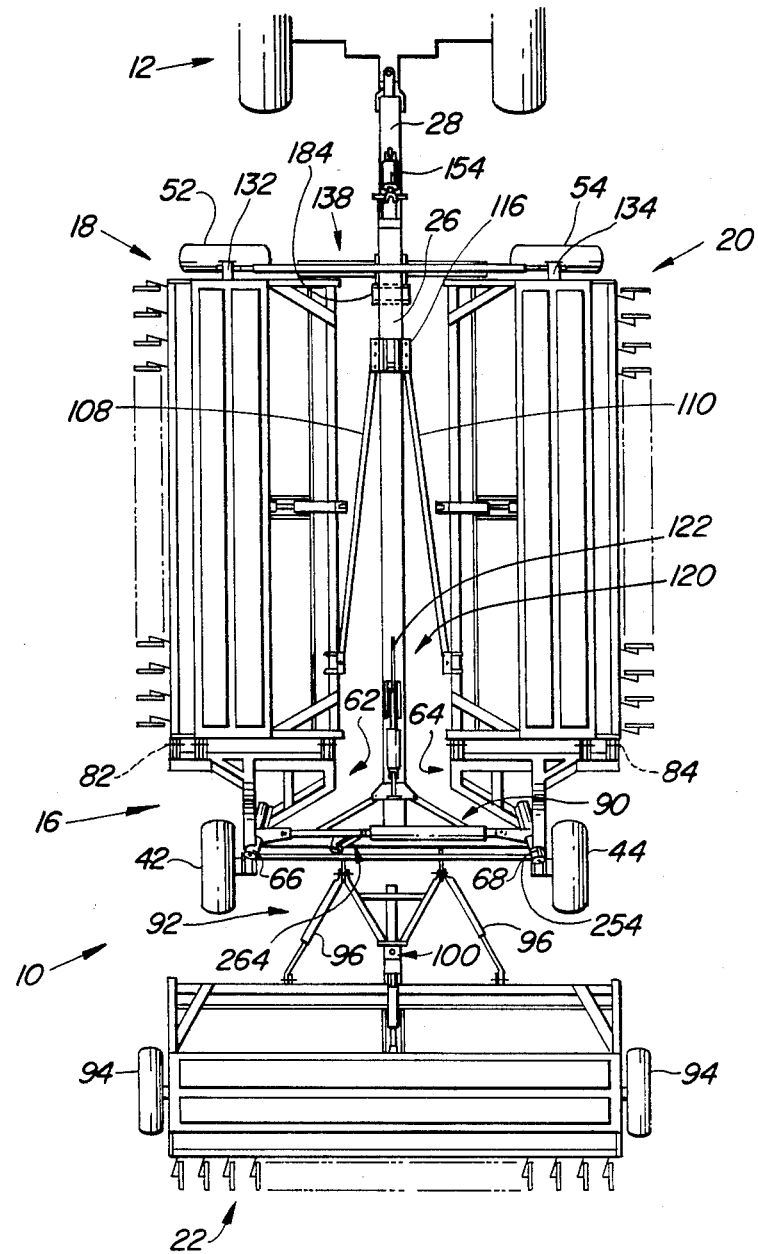
FIG. 2 is a view similar to FIG. 1, but showing the hitch arrangement in the folded transport position.

A hydraulically operated folding mechanism 90 is located directly above the transverse frame member 36 and is connected at its opposite ends to the hinge pivot bracket structures 62, 64 to rock the end wheel drills 18 and 20 about the respective pivots 66 and 68 between an outwardly extending field-working position (FIG. 1) and a forwardly extending transport position (FIG. 2). As the wing drills 18 and 20 are rocked forwardly, the angled pivots 66 and 68 cause the inboard ends 56 and 58 to automatically raise (FIG. 3) for good inboard end ground clearance. The hinge connections at 82 and 84 permit the end wheels 52 and 54 to remain in ground contact as the wing drills are folded forwardly. The ground wheels 42 and 44 of the hitch frame assembly 16 effectively act as the inboard end wheels for the wing drills 18 and 20 in the field-working position while the hinge connections permit good machine flexibility over uneven terrain. The ground wheels 42, 44 are preferably high flotation type and are substantially wider than the end wheels 52 and 54 to provide good flotation and reduce packing.

The trailing center drill 22 is connected by trailing hitch structure 92 to the transverse frame member 36 of the hitch frame assembly 16. The trailing drill 22 is supported by end wheels 94 both in the field-working (FIG. 1) and the transport (FIG. 2) configuration. Telescoping members 96 extend rearwardly and outwardly from a connection with the transverse frame member 36 to a connection with the forward portion of the frame of the drill 22 and prevent the forward portions of the drill 22 from interfering with the forward wing drills 18 and 20 during turns. The trailing drill 22 is centered between the wing drills 18 and 20 and provides a uniform seeding pattern across the width of the machine. To assure good trailing of the drill 22 during turns, the trailing hitch structure 92 includes an effective hitch connection 100 which is generally centrally located both in the fore-and-aft and transverse directions with respect to the drills.

To support the wing drills 18 and 20 in their field-working positions (FIG. 1) a sliding drag link structure 104 is provided having drag links 108 and 110 pivotally connected by pivot brackets 112 and 116 to the forward portions of the respective drills 18 and 20. The links 108, 110 extend inwardly and forwardly to a connection with a sliding block 116 slidably mounted on the hitch beam 26 for fore-and-aft movement thereon. A catch 118 is provided at the top of the sliding block 116 for engagement by a hydraulically operated latch assembly 120 when the wing drills 18 and 20 are pivoted rearwardly towards the field-working position of FIG. 1. The assembly 120 includes a latch 122 for engaging the catch 118 as the wing drills approach field-working position. The latch 122 is movable fore-and-aft by the hydraulic operating cylinder 124 to positively move the drag link structure 104 and the wing drills 18 and 20 to their final field-working position if necessary, for example, in soft ground conditions. Forward movement of the latch lifts the hooked end (FIG. 7) from the catch 118 to release the sliding drag link structure 104 for folding of the implements.

Figure 5:
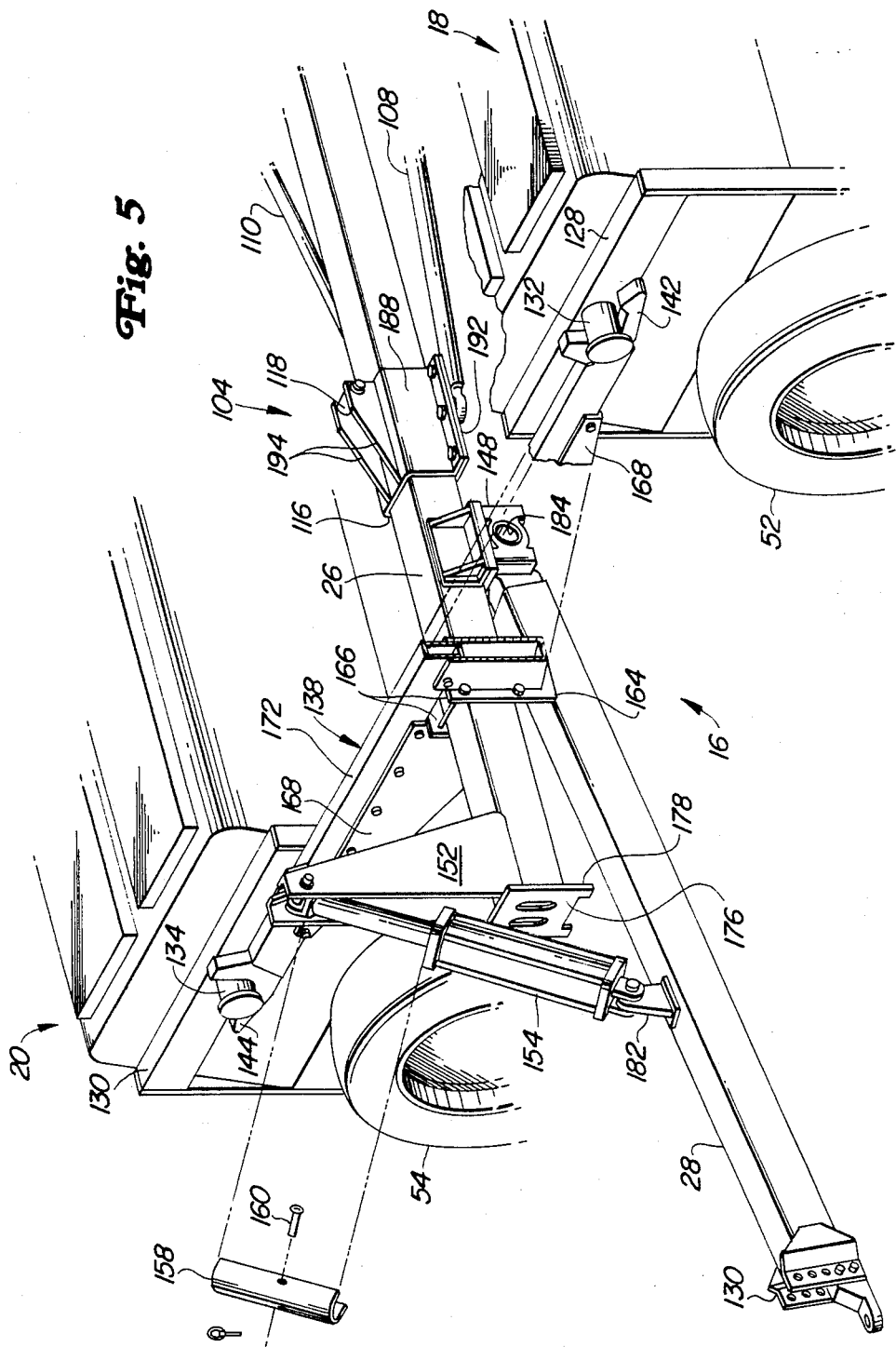
FIG. 5 is an enlarged perspective view of the front portion of the folding hitch arrangement in the raised transport position.

Lift brackets 128, 130 (FIG. 5) are fixed to the outermost ends 48 and 50 of the wing drills 18 and 20, respectively. Lift pins 132, 134 extend outwardly from the respective brackets 128 and 130. A lift arm assembly 138 is connected to the front of the main hitch beam 26 and extends transversely outwardly therefrom in both directions to hooked end portions 142, 144 which lie closely adjacent the outermost ends 48 and 50 of the wing drills 18 and 20 when the drills are in their forwardly folded transport positions (FIGS. 2 and 5). Structure is provided to move the lift arm assembly 138 vertically so that the hooked ends 142 and 144 engage the corresponding pins 132 and 134 to lift the outboard ends 48 and 50 of the drills from the ground in the transport position. In one embodiment (FIG. 9), the connector 30' is connected to the lower lift arms of the three point hitch arrangement on the tractor 12, and lifting is provided simply by raising the lower lift arms and thus the forward end of the hitch beam 26 with the three point hitch hydraulics. In the second embodiment as shown in FIGS. 1-5, the forward end portion 28 of the hitch frame assembly 16 is pivotally connected to the main hitch beam 26 slightly rearwardly of the forwardmost portion of the hitch beam 26 by a pivot bracket 148. A mast 152 extends upwardly from the forwardmost portion of the main hitch beam 26 and a lift cylinder 154 is pivotally connected between the upper end of the mast 152 and the forward end portion 28. When the drills 18 and 20 are in the field-working position and as the drills are pivoted forwardly from the field-working position towards the transport position, the cylinder 154 is normally retracted so that the forward portion of the main hitch beam 26 lies directly over and generally parallel to the aft portion of the end portion 28. After the wing drills 18 and 20 are pivoted to their fore-and-aft transport position (FIGS. 2 and 3) wherein the lift pins 132, 134 are located directly over the corresponding hooked ends 142, 144 of the lift arm assembly 138, the cylinder 154 is extended to cause the connector 30 on the end portion 28 to rock downwardly about the pivot bracket 148 which thereby raises the forward portion of the hitch beam 26. The hooked ends 142, 144 then engage the pins 132, 134 and lift the outboard ends 48, 50 to raise the end wheels 52, 54 from the ground (FIG. 4) and provide good transport clearance for the drills 18 and 20. The hinge connections at 82 and 84 permit the drills to rock upwardly with respect to the transverse frame member 36. Once the forward portion of the main hitch beam 26 is raised to the transport position as shown in FIG. 4, a U-shaped, elongated collar 158 is positioned over the rod of the cylinder 154 and locked thereon with a pin 160 to prevent the cylinder from retracting during transport.

As shown in FIG. 5, the lift arm assembly 138 includes a connecting bracket 164 with upright side plates 166 bearing against the sides of the beam 26 and extending downwardly below the bottom of the beam 26 to contact the sides of the forward end portion 28, which preferably is a tubular beam of rectangular cross section, to provide side stability for the tube 28. Triangularly shaped reinforcing members 168 are connected to the plates 166 and are bolted at their upper ends to a transverse beam 172 extending between the hooks 142 and 144.

A flat end plate 176 is welded to the forwardmost end of the beam 26 and includes a downwardly opening, U-shaped lower portion 178 adapted to embrace the sides of the beam 28 when the cylinder 154 is retracted. The plate 176, along with the side plates 166 of the connecting bracket 164 provide increased lateral stability for the forward portion of the hitch frame assembly 16. The lower end of the cylinder 154 is pivotally connected to a bracket 182 located rearwardly of the connector 30 on the beam 28. The pivot bracket 148 includes a large, transversely extending horizontal pivot bearing 184 rockably supporting the aft end of the beam 28.

The sliding block 116, which is located directly rearwardly of the pivot bracket 48 when the wing implements are in their forwardly folded positions (FIG. 5), includes a flanged, downwardly opening channel shaped member bolted to a lower plate 192 and connected to the forward eye ends of the links 108 and 110. Upright spaced plates 194 are connected to the upper end of the member 188 and support the catch 118 above the top surface of the beam 26.

Figure 6:
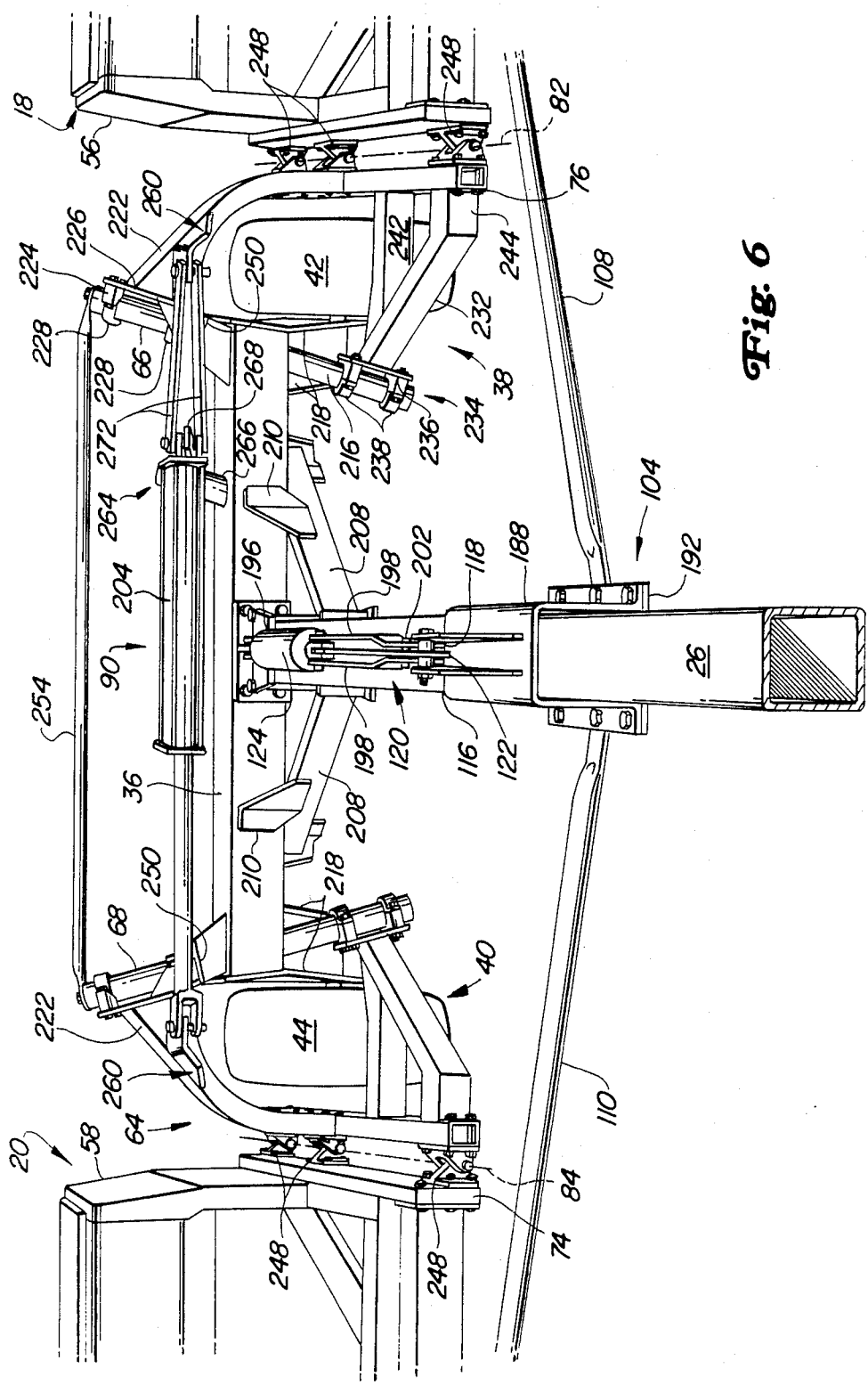
FIG. 6 is an enlarged perspective view looking toward the rear transverse frame member with the hitch arrangement in the field-working postion.

The cylinder 124 of the latch assembly 120 includes a cylinder end connected by a bracket 196 to the aft end of the beam 26. The rod end of the cylinder 124 is constrained for linear movement generally parallel to the top of the beam 26 by a pair of slotted side plates 198. The aft end of the latch 122 is pivotally connected to the rod end of the cylinder by a pin 199 which extends through the side plate slots for movement fore-and-aft with the rod end. As the cylinder 124 is extended with the wing drills 18 and 20 in their outwardly extending, field-working positions (FIG. 6) the hooked end of the latch 122 moves up and over the catch 118 on the sliding block 116. The cylinder can then be retracted if necessary to pull the sliding block 116 to its rearwardmost transport position for securing the drag links 108 and 110 along the beam 26. The lower side of the latch 122 adjacent the hooked end is ramped at 200 and is adapted to ride over a sleeve 202 connected between the forward ends of the side plates 198 so that upon extension of the cylinder 124 the latch will raise to permit the sliding block 116 to move forwardly over the beam 26 upon retraction of the hydraulically operated folding mechanism 90. The folding mechanism 90 includes a cylinder 204 connected in parallel with the cylinder 124 and to a source of hydraulic fluid (not shown) on the tractor 12. As the cylinder 204 is retracted to pivot the wing drills 18 and 20 forwardly, the cylinder 124 will be extended to release the latch 122 from the catch 118. Upon extension of the cylinder 204 to move the wing drills 18 and 20 to their field working positions, the cylinder 124 will be retracted from the position shown in FIG. 7 to permit the latch 122 to rock fully downwardly. As the catch 118 moves into engagement with the latch 122, the latch 122 will ride up over the catch and engage automatically under most operating conditions. However, in soft operating conditions, it may be necessary to operate the source of hydraulic fluid to move the cylinder 124 to an extended position wherein the latch 122 moves forwardly to engage the catch 118 before the sliding block 116 has reached the fully rearward field-working position (FIG. 6). A stop 206 is provided to limit the travel of the block 116 in the rearward direction on the beam 26.

For increased rigidity and strength, a pair of diagonal braces 208 (FIG. 6) is connected between the aft end of the beam 26 and the transverse frame member 36. The braces 208 extend under the beams 26 and 36 and are connected by angle brackets 210 to the beam 36.

The pivots 66 and 68 and the corresponding hinged pivot bracket structures 62 and 64 are substantially mirror images of each other, and therefore only the pivot 66 and the corresponding pivot bracket structure 62 will be described in detail here. The pivot 66 includes a round tubular member 216 which extends completely through the upper and lower surfaces of the outermost end of the square tubular beam 36. The tubular member 216 is angled both rearwardly and outwardly in the upward direction from the vertical. Preferably, the member 216 is angled approximately eighteen degrees in both directions. The rearward tilt of the pivot 66 provides for lifting of the inboard end 56 as it is rotated forwardly about the axis of the tubular member 216, and to prevent the grain box on the drill 18 from tilting during folding, an identical outward tilt is provided. The tubular member 216 is welded closely adjacent to transversely spaced plate structure 218 of the wheel assembly 38.

Figure 7:
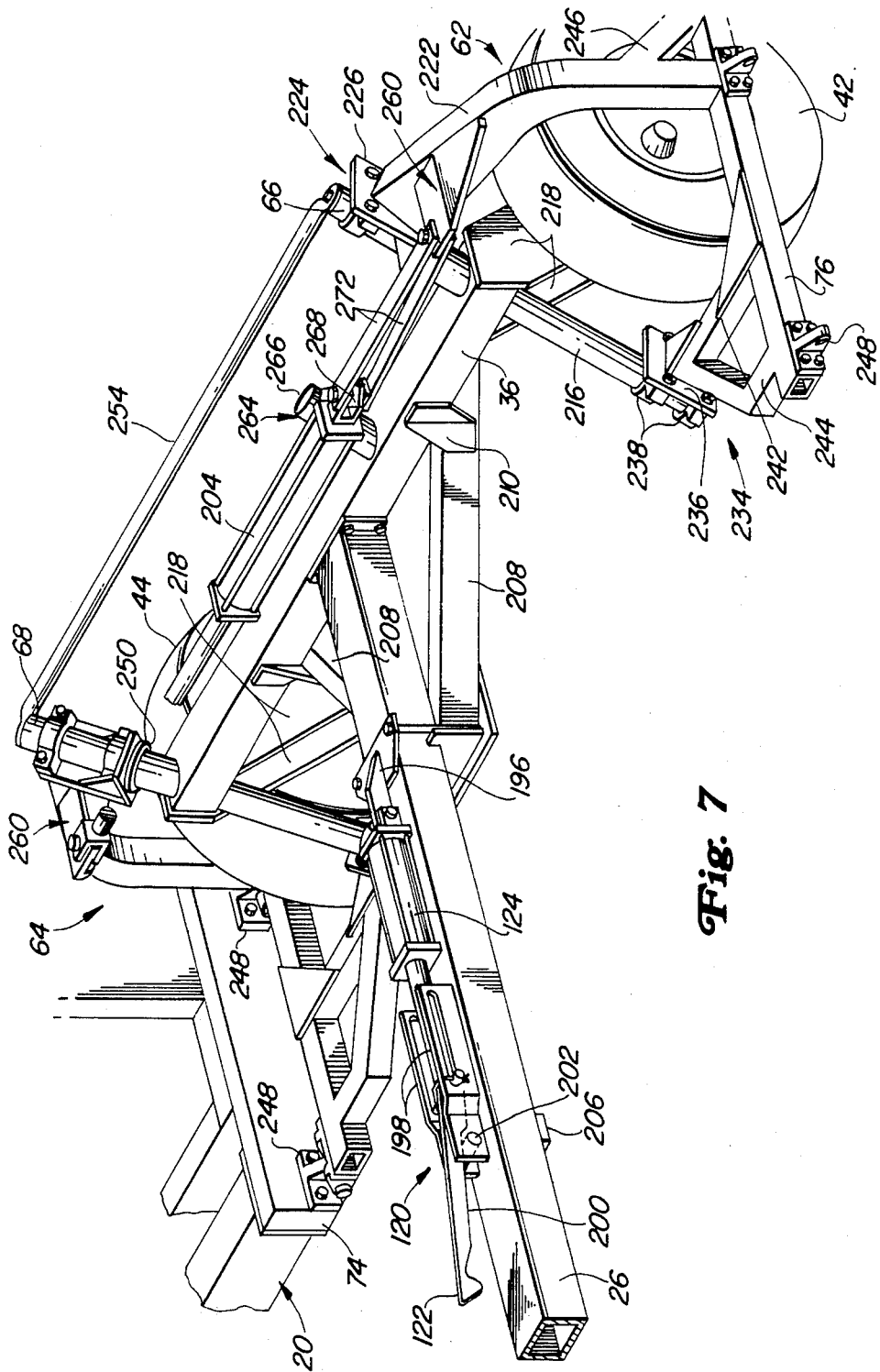
FIG. 7 is an enlarged perspective view of the rear transverse frame member with some parts removed for clarity.

The pivot bracket 62 includes an outwardly and downwardly extending curved arm 222 pivotally connected to the upper portion of the tubular member 216 by a bearing assembly 224 which includes a plate 226 fixed to the upper end of the arm 222. Bearings 228 carried on the plate 226 are assembled around the upper end of the member 216. A lower arm assembly 232 is connected by a bearing assembly 234 to the lowermost end of the tubular member 216. The bearing assembly 234 includes a plate 236 fixed to the innermost portion of the lower arm assembly 232 and supporting a pair of vertically spaced bearings 238. The bearings 238 are assembled around the lower end of the tubular member 216 to permit the lower arm assembly to rock about the pivot 66. The lower arm assembly 232 includes frame members 242 and 244 extending outwardly in front of the wheel 42 to connections with the structure 76, which in the preferred embodiment, is a horizontally supported tubular beam of rectangular cross section. The lower end of the curved arm 222 is connected to the tubular beam 76 rearwardly of the frame member 242 and outwardly adjacent the wheel 42, when the wing drill 18 is in the field-working position (FIGS. 6 and 7). A diagonal brace 246 extends upwardly from the aft end of the beam 76 to a connection with the arm 222. Three pinned hinges 248 connect the hinge bracket 72 to the beam 76. The lower bearing 228 of the bearing assembly 224 rests on a ledge 250 which limits the downward sliding of the bracket structure 62 on the tubular member 216. The upper ends of the pivots 66 and 68 are braced by a transversely extending tubular member connected to the top of the tubular members 216.

Cylinder brackets 260 are connected to the forward portions of the upper ends of the arms 222. The rod end of the cylinder 204 is connected to the bracket 260 of the bracket structure 64. The cylinder end is supported above the beam 36 by a rocking cylinder support bracket 264 which includes an upright pivot 266 fixed to the upper surface of the beam 36 and offset from the vertical. An arm 268 is rockably connected to the upright pivot 266 and extends forwardly therefrom to a pivotal connection with the cylinder end and with one end of a transversely extending link 272. The opposite end of the link 272 is pivotally connected to the cylinder bracket 260 located on the pivot bracket structure 62. Therefore, a single cylinder 204 can rock the pivot bracket structures 62 and 64 between their field-working and transport positions. To move the bracket structures 62 and 64 forwardly from the field-working position shown in FIG. 6, the operator actuates a hydraulic system to retract the cylinder 204. At the same time the cylinder 124 of the hydraulically operated latch assembly 120 is extended to lift the latch 122 from the catch 118. The cylinder 204 then begins to retract rocking the wing drills 18 and 20 about their respective pivots 66 and 68 towards the forward transport position as the drag links 108 and 110 move the sliding block 116 forwardly over the beam 26. Extending the cylinder 204 moves the bracket structures 62 and 64 outwardly toward the field working position. In the transport position, the wheels 42 and 44 effectively act as the end wheels for the inboard ends 56 and 58 of the wing drills 18 and 20. The bracket structures 62 and 64 support the inboard ends 56 and 58, respectively, closely adjacent the wheels 42 and 44 while the hinges 248 permit a high degree of flexibility of each of the wing drills 18 and 20 for movement over rough terrain.

Figure 8:
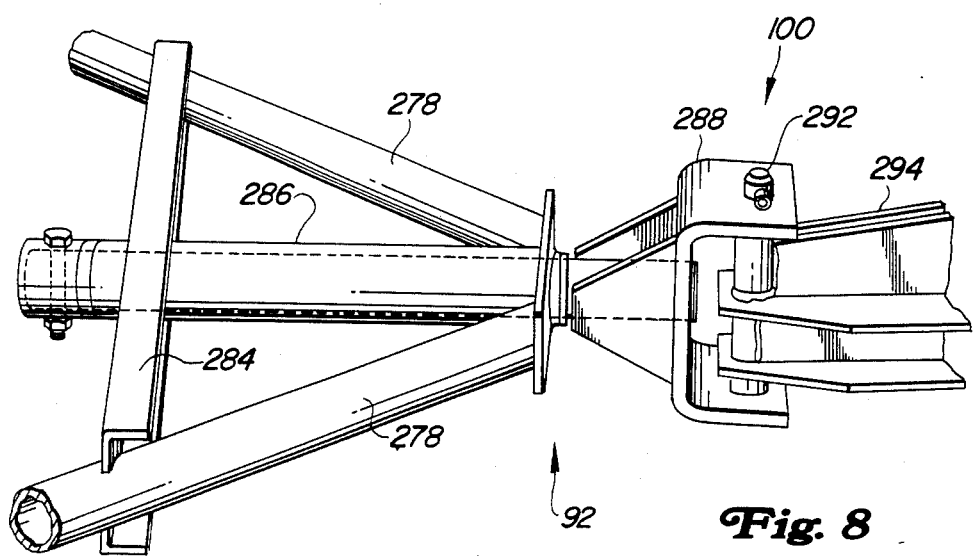
FIG. 8 is an enlarged view of a portion of the trailing hitch structure.

The trailing hitch structure 92 (FIGS. 1 and 8) includes a pair of rearwardly converging links 278 pivotally connected by brackets 282 to the rear face of the beam 36 for rocking about a transversely extending horizontal axis. The links 278 and a cross member 284 support a fore-and-aft extending tube 286 which in turn rockably mounts an upright clevis 288 which can rotate in the tube 286 about the axis of the tube. An upright pin 292 extends through the clevis and through a forward connector 294 on the trailing end wheel drill 22. The entire trailing drill 22 can therefore rock up and down about the brackets 282 with respect to the hitch frame assembly 16. During turns the trailing drill 22 can rock from side to side about the upright pin 292 at the effective hitch point 100. The rocking clevis 288 permits the ends of the trailing drill 22 to move vertically with respect to each other without binding of the trailing hitch structure 92. By generally centering the effective hitch point 100 between the wing drills 18 and 20 and the trailing drill 22, good trailing characteristics are obtained for more uniform planting as the hitch frame assembly 16 is turned from the forward direction during planting. The telescoping members 96 limit the rocking of the trailing drill 22 about the upright pin 292 to prevent interference between the drill 22 and either of the wing drills 18 or 20 during turns. The members 96 may be pinned to prevent telescoping so that the hitch frame assembly 16 may be backed up easily.

Figure 9:
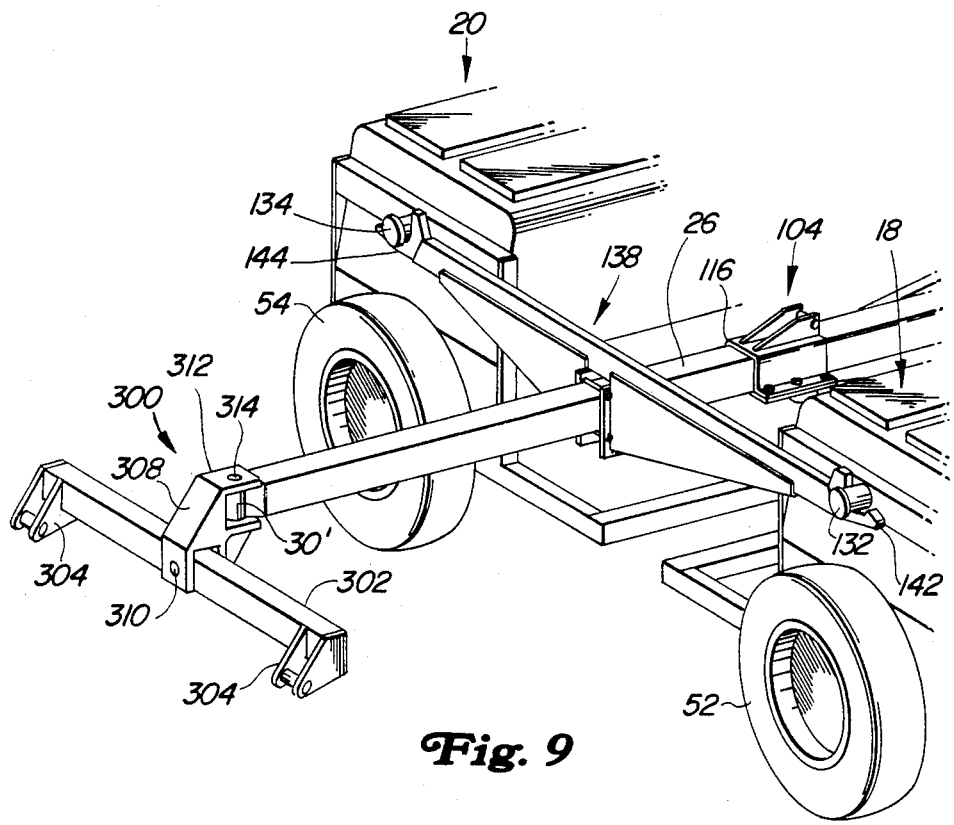
FIG. 9 is an alternate embodiment of the forward connector assembly.

As seen in FIG. 9, an alternate connecting assembly 300 may be provided for the forward end of the main hitch beam 26 for connection to the lower arms of a three bar linkage on the rear of the tractor 12. The connector assembly 300 includes a transverse beam 302 having a pair of forwardly extending spaced connectors 304 for pivotally connecting the beam 302 to the lower links of the tractor three point hitch. An intermediate connector 308 is pivotally connected to the central portion of the beam 302 by a pin 310 which permits the connector 308 to rock generally about a fore-and-aft extending horizontal axis. The intermediate connector 308 extends upwardly and rearwardly from the pivotal connection with the transverse beam 302 to a rearwardly extending portion 312 which is adapted for connection by an upright pivot pin 314 to the connector 30' located on the forward end of the forwardly extended main beam 26. After the wing drills 18 and 20 are pivoted forwardly, the lower links of the three bar hitch structure on the tractor 12 are raised to raise the forward end of the beam 26 and lift the wheels 52 and 54 from the ground for transport.

In operation, the hitch frame assembly with the implements 18, 20 and 22 attached thereto is towed to the field in the transport position as shown in FIG. 1. Once in the field, the main hitch beam 26 is lowered until the outermost end wheels 52 and 54 on the drills 18 and 20, respectively engage the ground and the hooks 142 and 144 are cleared from the lift pins 132 and 134. The folding mechanism 90 is then operated to pivot the bracket structures 62 and 64 about the pivots 66 and 68 to move the drills 18 and 20 to their outwardly extended positions (FIG. 2) and to lower the inboard ends 56 and 58 of the drills 18 and 20 to the field-working positions. The latch assembly 120 secures the sliding block on the beam 26 so that the drag links 108 and 110 hold the wing drills 18 and 20 in the desired positions on either side of the hitch frame assembly 16. Conventional furrow opening and closing assemblies 320 are supported on the frames of the respective drills 18-22 and are movable vertically by hydraulic cylinders 322 between lower soil engaging positions and upper positions wherein the assemblies are removed from ground contact. The hydraulic cylinders 322 are operated to move the assemblies 320 into the soil engaging position, and the hitch arrangement 10 is moved forwardly over the field to plant parallel rows of seeds in the ground. The trailing hitch structure 92 assures that a substantially uniform row spacing is provided across the width of the machine, even when the hitch frame assembly 16 is turned from the forward direction. The hitch structure 92 also permits the trailing drill 22 to move over ground contours independently of the hitch frame assembly 16. The outer ends 48 and 50 of the wing drills 18 and 20 can move up and down with respect to the outer ends of the hitch frame assembly 16. Therefore, high degree of flexibility is maintained during the field-working operation by the hitch frame assembly 16.

When the operator desires to narrow the transport hitch arrangement 10 for transport, the hydraulic operator control on the tractor is moved to retract the cylinder 204 of the folding mechanism 90. The cylinder 124, which is connected in parallel with the cylinder 204, first extends to raise the latch 122 from the catch 118 (FIG. 8) so that the sliding block 116 may be free to move over the main beam 26. The cylinder 204 then rocks the hinge pivot bracket structures 62 and 64 inwardly and forwardly to move the wing drills 18 and 20 towards the transport position and at the same time, raises the inboard ends 56 and 58 of the drills. After the drills reach their forwardmost transport positions adjacent the forward portion of the main beam 26, the forward end of the beam 26 is lifted to raise the outboard ends 48 and 50 onto the lift arm assembly 138. The wheels 52 and 54 are lifted from the ground (FIG. 4) for transport. In the transport position, a compact arrangement of the implements 18-22 is provided with the outermost portions of the wing drills 18 and 20 located generally in line with or slightly inwardly from the outermost portions of the end wheels 94 of the trailing drill 22. The complete folding and unfolding operations can be achieved without the operator having to leave the cab of the tractor 12.

Having described the preferred embodiment, it will be apparent that modifications can be made without departing from the scope of the invention as defined in the accompanying claims.

We claim:

1. Folding implement transport hitch structure comprising:
    a hitch frame;
    wheel means for supporting the hitch frame for forward movement over the ground behind a towing vehicle;
    a transversely extending implement defining a generally longitudinally implement axis and having first and second ends and a material container;
    means for supporting the first end of the implement from the hitch frame;
    upright pivot means rockably connecting the implement to the hitch frame for rocking between a transversely extending field-working position and a fore-and-after extending transport position, said pivot means including an upright pivot and means connecting the upright pivot to the hitch frame with said pivot angled from the vertical by generally identical acute angles both in the fore-and-aft and outward directions for maintaining the material container in a preselected attitude with respect to the implement axis as the implement is rocked between the field-working and transport positions, and bracket means hingedly connected the first end to the pivot radially outward of the pivot for lifting the first end relative to the second end as the implement is rocked about the pivot from the field-working position to the transport position; and means for rocking the implement between the field-working and transport positions.

2. The invention as set forth in claim 1 wherein the bracket means includes hinge means having a hinge axis which extends in the fore-and-after direction when the implement is in the field-working position for rockably connecting the first end to the pivot so that the second end is movable vertically with respect to the hitch frame.

3. The invention as set forth in claim 2 wherein the second end is supported for movement over the ground by a ground-engaging end wheel and wherein said wheel means includes a hitch frame wheel located outwardly adjacent the pivot and aligned in the transverse direction with the end wheel when the implement is in the field-working position.

4. The invention as set forth in claim 3 wherein the hinge axis is located outwardly adjcent the hitch frame wheel when the implement is in the field-working position and extends transversely to the forward direction when the implement is in the transport position, the pivot is located inwardly adajcent the hitch frame wheel, and said structure further includes means for lifting the second end to pivot the implement about the hinge axis when the implement is in the fore-and-aft extending transport position to lift the end wheel from the ground for transport.

5. The invention as set forth in claim 4 wherein the hitch frame includes fore-and-aft extending beam structure, said beam structure having a forward end with connector means for connecting the hitch frame to the towing vehicle, and when the implement is in the transport position, the second end is located adjacent the forward end; and wherein the means for lifting the second end includes impelment engaging structure extending outwardly from the forward end of the beam structure for contacting the implement when the implement is pivoted forwardly, and means for lifting the beam structure.

6. The invention as set forth in claim 5 wherein the forward end of the beam structure includes a pivot joint and the means for lifting further includes cylinder means for rocking the connector means downwardly about the joint.

7. The invention as set forth in claim 3 wherein the wheel means comprises a pair of transversely spaced wheels rotatably mounted on the aft end of the hitch frame, the upright pivot means is located inwardly adjacent one of said spaced wheels, and the bracket means includes upper and lower arm portions, which when the implement is in the field-working position extend around said one of the spaced wheels and support the first end of the implement outwardly adjacent said one of the wheels to thereby maintain a generally constant vertical offset of said first end with respect to the ground, and wherein the ground engaging end wheel is transversely aligned with said spaced wheels when the implement is in the field-working position.

8. The invention as set forth in claim 7 further including implement hitch means for connecting a second implement in trailing and transversely offset relationship to the first-mentioned implement, said hitch means defining an effective hitch point located centrally in the transverse direction between the spaced wheels and rearwardly of the first implement approximately half the fore-and-aft distance between the first and second implements for causing the second implement to trail the first implement.

9. The invention as set forth in claim 2 wherein the upright pivot means is angled rearwardly in the upward direction and extends through the hitch frame, wherein the lower arm portion is connected to the pivot means at a location inwardly and forwardly of side one of wheels and the upper arm portion is connected to the pivot means at a location inwardly and above said one of the wheels.

10. Multiple implement transport hitch structure adapted for forward movement over the ground, said hitch structure comprising:

a fore-and-aft extending hitch frame;

first and second transversely spaced ground engaging wheels connected to the aft end of the hitch frame;

first and second transversely elongated wing implements, each having an inboard and an outboard end;

means pivotally connecting the inboard ends of the first and second wing implements to the hitch frame adjacent the first and second ground engaging wheels, respectively, for rocking about upright axes between a transversely extending field-working position and a fore-and-aft extending transport position, said means pivotally connecting said wing implements including means for lifting the inboard ends of the implements as the implements rock toward the transport position and hinge means connected to the inboard ends supporting said inboard ends a preselected distance above the ground on the respective ground engaging wheels for rocking about fore-and-aft extending axes located closely adjacent the respective ground engaging wheels when in the field-working position, wherein the wing implements each include an outermost ground wheel supporting the outboard ends a preselected distance above the ground when the implements are in the field-working position;

a trailing implement having transversely spaced end wheels, and means for towing the trailing implement with the end wheels in ground contact, rearwardly of and generally between the wing implements, in both the field-working and transport positions; and wherein said means for towing includes a towing hitch connecting the trailing implement to the hitch frame, said towing hitch having an effective hitch point located in the transverse direction centrally between the wing implements, said hitch point located in the fore-and-aft direction halfway between the wing implements and the trailing implement and comprising upright pin means rockably connecting the trailing impelment to the towing hitch for movement from side to side relative to the wing implements as the hitch frame is turned from the forward direction.

11. The invention as set forth in claim 10 wherein the wing and trailing implements comprise end wheel drills, and wherein the hitch frame wheels effectively act as the respective inboard end wheels for the drills, said means pivotally connecting the inboard ends supporting the wing drills with the outermost end wheels in transverse alignment with each other and with the ground-engaging wheels of the hitch frame when the drills are in the field-working position.

12. The invention as set forth in claim 10 wherein the towing hitch includes telescoping means extending between the trailing implement and the hitch frame for preventing interference between the trailing drill and the wing implements.

13. The invention as set forth in claim 10 wherein the means pivotally connecting said wing implements includes upright pivot structure and the means for lifting the inboard ends comprise means for supporting the upright pivot structure inwardly adjacent the respective ground engaging wheels with the upright axes offset from the vertical approximately an equal acute angle both in the fore-and-aft and transverse directions, and bracket means extending radilaly outwardly from the upright axes, said hinge means including horizontal hinges connected to the respective inboard ends, said hinges connected to the bracket means adjacent the respective ground engaging wheels when the wing implements are in the field-working position so that the inboard ends move upwardly as the implements rock to the transport position.

14. The invention as set forth in claim 13 including lift means for raising the forward end of the hitch beam and rocking the outboard ends of the wing implements about the hinges when the implements are in the fore-and-aft transport position.

15. End wheel drill transport hitch structure comprising;
a hitch frame including fore-and-aft extending hitch beam and a transversely extending frame member connected to the aft end of the beam;
a pair of ground wheels supported for rotation on the frame member in transversely spaced relation;
a pair of end wheel wing drills, each having an outboard end supported for movement over the ground by an outboard end wheel;
means supporting the inboard ends of the wing drills from the hitch frame closely adjacent the respective ground wheels for movement over the ground, said means supporting including upright pivot means pivotally connecting the inboard ends of the wing drills to the frame member for rocking about upright axes between a transversely extending field-working position wherein the end wheels and the ground wheels are transversely aligned and a fore-and-aft transport position wherein the outboard ends are located closely adjacent the forward end of the hitch beam;
wherein the means for supporting the inboard ends of the wing drills includes horizontally disposed hinge means for supporting the inboard ends a preselected distance above the ground on the ground wheels, said hinge means connecting the wing drills for additionally rocking about horizontal fore-and-aft axes outwardly adjacent the respective ground wheels when the wing drills are in the field-working position;
means for rocking the wing drills between the field-working and tranport positions; and
means for rocking the outboard ends of the drills upwardly about the hinge means for support by the hitch frame when the drills are in the fore-and-aft transport position.

16. The invention as set forth in claim 15 wherein the means for rocking the wing drills between field-working and transport positions includes a single transversely extending hydraulic cylinder having a rod end operably connected to the upright pivot means associated with one of the wing drills and a cylinders end operably connected to the upright pivot means associated with the other of the wing drills.

17. The invention as set forth in claim 16 further comprising a pair of diagonal drag links, slide block means slidably connecting the forward ends of the drag links to the hitch beam for fore-and-aft movement thereon, means pivotally connecting the aft ends of the drag links to the respective wing drills for moving the wing drills substantially in unison as the hydraulic cylinder is operated, and additional cylinder means for positively sliding the slide block means to a rearwardmost locked position as the wing drills are rocked to the field-working position.

18. The invention as set forth in claim 17 wherein the additional cylinder means includes latch means engageable with the slide block means when the wing drills approach the field-working position.

19. The invention as set forth in claim 25 wherein the latch means includes a latch movable between locking and unlocking positions and means for automatically moving the latch to the unlocking position as the first-mentioned hydraulic cylinder is actuated to rock the drills from the field-working position toward the transport position.

20. The invention as set forth in claim 19 wherein the means for automatically moving the latch includes means for automatically moving the latch to the locking position as the first-mentioned hydraulic cylinder is actuated to move the wing drills from the transport position toward the field-working position.

21. The invention as set forth in claim 17 wherein the additional cylinder means comprises a single hydraulic cylinder connected in parallel with the first-mentioned hydraulic cylinder.

22. Multiple implement transport hitch structure adapted for forward movement over the ground, said hitch structure comprising:
a fore-and-aft extending hitch frame;
first and second transversely spaced ground engaging wheels connected to the aft end of the hitch frame;
first and second transversely elongated wing implements, each having an inboard end and an outboard end;
means pivotally connecting the inboard ends of the first and second wing implements to the hitch frame adjacent the first and second ground engaging wheels, respectively, for rocking about upright axes between a transversely extending field-working position and a fore-and-aft extending transport position, said means pivotally connecting said wing implements including means for lifting the inboard ends of the implements as the implements rock toward the transport position and hinge means connected to the inboard ends supporting said inboard ends a preselected distance above the ground on the respective ground engaging wheels for rocking about fore-and-aft extending axes when in the field-working position, wherein the wing implements each include an outermost ground wheel supporting the outboard ends a preselected distance above the ground when the implements are in the field-working position, and wherein the means pivotally connecting said wing implements includes upright pivot structure and the means for lifting the inboard ends comprises means for supporting the upright pivot structure inwardly adjacent the respective ground engaging wheels with the upright axes offset from the vertical approximately an equal acute angle both in the fore-and-aft and the transverse directions, and bracket means extending radially outwardly from the upright axes, said hinge means including horizontal hinges connected to the respective inboard ends, said hinges connected to the bracket means adjacent the respective ground engaging wheels when the wing implements are in the field-working position so that the inboard ends move upwardly as the implements rock to the transport position;

a trailing implement having transversely spaced end wheels, and means for towing the trailing implement with the end wheels in ground contact, rearwardly of and generally between the wing implements, in both the field-working and transport positions; and wherein said means for towing includes a towing hitch connecting the trailing implement to the hitch frame, said towing hitch having an effective hitch point located in the transverse direction centrally between the wing implements, said hitch point located in the fore-and-aft direction halfway between the wing implements and the trailing implement.

* * * * *

UNITED STATES PATENT AND TRADEMARK OFFICE
CERTIFICATE OF CORRECTION

PATENT NO. : 4,723,787

DATED : 9 February 1988

INVENTOR(S) : Howard C. Hadley et al

It is certified that error appears in the above-identified patent and that said Letters Patent is hereby corrected as shown below:

Column 10, line 52, change "longitudinally" to -- longitudinal --; line 59, change "fore-and-after" to -- fore-and-aft --; and line 68, change "connected" to -- connecting --.

Column 11, line 9, change "fore-and-after" to -- fore-and-aft --; line 22, change "adjcent" to -- adjacent --; line 26, change "adajcent" to -- adjacent --; and line 39, change "impelment" to -- implement --.

Column 12, line 9, change "side" to -- said --; and after "one of", insert -- the --.

Column 13, line 4, change "drill" to -- implement --; and line 14, change "radilaly" to -- radially --.

Column 14, line 19, change "25" to -- 18 --.

Signed and Sealed this

Nineteenth Day of July, 1988

Attest:

DONALD J. QUIGG

Attesting Officer

Commissioner of Patents and Trademarks